United States Patent [19]

Boillat

[11] Patent Number: 4,672,282
[45] Date of Patent: Jun. 9, 1987

[54] STEPPING MOTOR CONTROL CIRCUIT
[75] Inventor: Pierre Boillat, Meyriez, Switzerland
[73] Assignee: Sodeco-Saia AG, Murten, Switzerland
[21] Appl. No.: 720,093
[22] Filed: Apr. 5, 1985
[30] Foreign Application Priority Data
Apr. 10, 1984 [CH] Switzerland .......................... 1796/84
[51] Int. Cl.⁴ ............................................. H02P 8/00
[52] U.S. Cl. .................................... 318/696; 318/685; 368/157
[58] Field of Search ................. 318/696, 685; 368/157

[56] References Cited
U.S. PATENT DOCUMENTS
4,446,413  5/1984  Remus et al. ....................... 318/696

Primary Examiner—William M. Shoop, Jr.
Assistant Examiner—Saul M. Bergmann
Attorney, Agent, or Firm—Marmorek, Guttman & Rubenstein

[57] ABSTRACT

Circuitry for measuring the torque of a stepping motor is disclosed. The circuitry is based on the fact that the decay time of the current flowing through the stator coils is a function of the torque of the stepping motor.

22 Claims, 9 Drawing Figures $i = 1, 2, 3, \ldots, 8$

STEPPING MOTOR CONTROL CIRCUIT

FIELD OF THE INVENTION

This invention relates to a method and circuit for the control of a D.C. stepping motor.

BACKGROUND OF THE INVENTION

D.C. stepping motors are well known. D.C. stepping motors and their associated driving circuitry are disclosed in "Proceedings of the Third International MOTORCON '82 Conference", Sept. 28–30, 1982 Geneva, Switzerland, pages 158 and in "Linear Integrated Circuits" pages 6-129 to 6-134. The latter reference is published by Motorola of Phoenix, Ariz. and discloses a stepping motor drive of the type SAA 1042.

The object of the present invention is to provide a method and circuit for detecting the torque of a stepping motor which can be used in large scale manufacturing operations.

SUMMARY OF THE INVENTION

The circuitry for driving a D.C. stepping motor comprises at least one inductance coil per phase. Each coil has a controlling switch associated therewith, so that when an appropriate control signal is applied to the switch, current flows through the coil and the coil becomes energized. When the control signal is removed from the switch, the current flowing through the coil does not drop to zero instantaneously, the current flowing through the coil decays to zero with a characteristic time constant. The time duration of this transient current depends on the torque of the stepping motor. Thus, circuitry is provided to compare the actual duration of the transient current (which corresponds to the actual torque) to a reference duration (which corresponds to a reference value of the torque). As a result of this comparison, control signals are generated.

This type of circuitry may be used to determine the difference between the angular position of the rotor of a D.C. stepping motor and the phase angle of a control signal used to control one or more of the stator coils. The circuitry of the present invention may also be used to stop or reverse the direction of rotation of the stepping motor or to regulate the motor so as to produce a fixed torque. The circuitry may also be used to avoid important oscillations in mechanical elastic systems, where these oscillations are produced by accumulation of potential energy in the elastic elements of the system and where these oscillations may lead the stepping motor to oscillate between synchronism and asynchronism, so that the stepping motor loses his capability to function as digital/analog converter. Finally, the circuitry of the present invention may also be useful in correcting irregularities in the running of D.C. stepping motors.

BRIEF DESCRIPTION OF THE DRAWINGS

Like elements in the drawings are identified with like numerals. For purposes of clarity the drawings have not been drawn to scale.

DETAILED DESCRIPTION OF THE INVENTION

Figure 1:
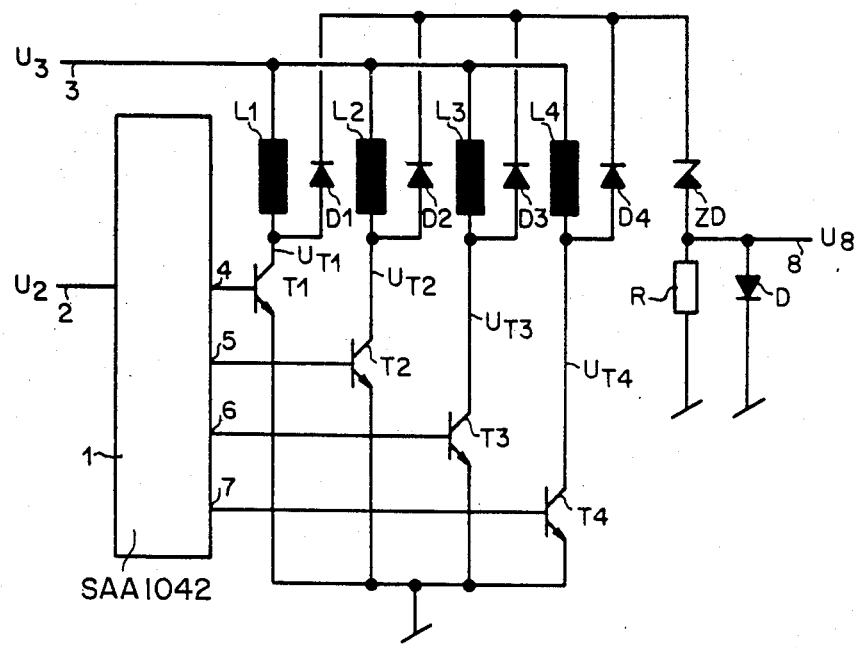
FIG. 1 shows a circuit for driving a four phase D.C. stepping motor, in accordance with an illustrative embodiment of the present invention.

Turning to FIG. 1, driving circuitry for a four phase D.C. stepping motor is illustrated. The driving circuitry of FIG. 1 comprises four stator coils L1, L2, L3, L4, one coil for each of the four phases. Four controllable switches T1, T2, T3, T4 are also provided. Each of the switches T1, T2, T3, T4 is associated with one of the coils L1, L2, L3, L4 respectively. Illustratively, as shown in FIG. 1, the switches T1, T2, T3, T4 are NPN transistors. Alternately, the switches T1, T2, T3, T4, may be implemented as PNP transistors with appropriate reversal of voltage polarities.

Figure 2:
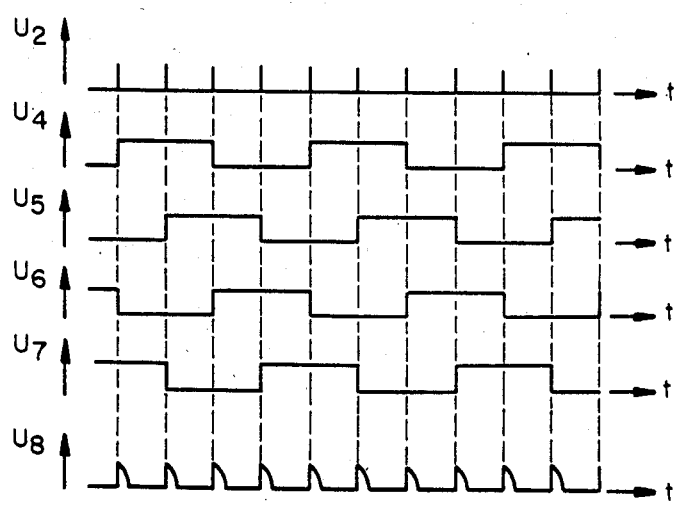
FIG. 2 shows a time diagram for the switching of the circuitry of FIG. 1.

A sequence generator 1 such as the Motorola SAA 1042 is used to generate control signals which are applied to the switches T1, T2, T3, T4. The sequence generator 1 receives clock signal U2 of FIG. 2 as an input signal and generates in response thereto control signals U4, U5, U6, and U7. The control signals U4, U5, U6, U7 are applied to switches T1, T2, T3, and T4 respectively. The clock signal U2 is a sequence of short duration pulses. The frequency of the clock signal U2 is four times as high as the frequency of the control signals U4, U5, U6, U7. The control signals U4, U5, U6, U7 comprise rectangular voltage pulses, which pulses have a duty cycle of 50%. As shown in FIG. 2, successive control signals U4, U5, U6, U7 are displaced by a quarter of a cycle.

When the control signals U4, U5, U6, U7 go positive, the respective coils L1, L2, L3, L4 are switched between positive D.C. voltage U3 and ground. The Voltage U3 is applied to each of the coils L1, L2, L3, L4 by means of line 3.

When the control signals U4, U5, U6, U7 are positive and the coils L1, L2, L3, L4 are switched between voltage U3 and ground, the diodes D1, D2, D3, D4 associated with the coils L1, L2, L3, L4, respectively, are biased so that no current flows through them. On the other hand when the switches T1, T2, T3, T4 are turned off, the currents flowing in the coils L1, L2, L3, L4 do not immediately fall to zero. Instead the currents flowing in the coils decay to zero with a particular time constant. When the switches T1, T2, T3, T4 are turned off, the respective diodes D1, D2, D3, D4 are biased to pass these transient currents.

The current paths for the transient currents are combined to a common path which includes the Zener diode ZD followed by resistance R. A diode D is connected in parallel with the resistance R, cathode to ground. The voltage across the resistance R forms the output signal U8 of the circuitry of FIG. 1.

Two of the coils L1, L2, L3, L4 are always energized at the same time. After each period of the clock signal U2 one of the two coils is turned off and another is turned on. Thus after each period of the clock signal one of the diodes D1, D2, D3, D4 is biased to pass a transient current from an associated coil L1, L2, L3, L4. The transient current passes through the Zener diode ZD and resistance R to ground.

The voltage U8 across the resistance is a result of one transient current pulse for each clock period. The voltage U8 across the resistance R is limited to about 0.7 V because of the use of diode D. Thus the output voltage U8 comprises a sequence of non rectangular pulses, one pulse occurring at the end of each clock period. The duration of each of the pulses comprising the output signal U8 is equal to the duration of the transient current of the coils L1, L2, L3, L4.

Figure 3:
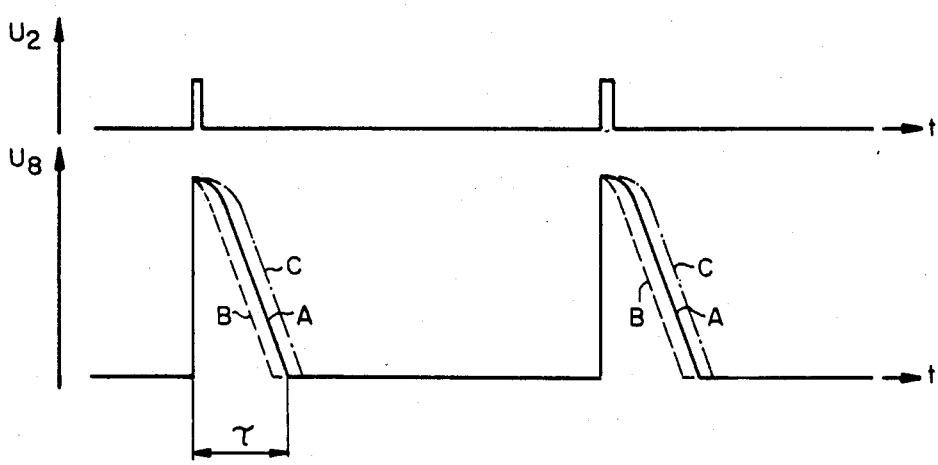
FIG. 3 shows the duration of the transient current of the stator coils of FIG. 1.

FIG. 3 shows an enlarged view of the clock signal U2 and an enlarged view of the output signal U8. As can be seen in FIG. 3, the leading edge of the output signal pulses corresponds to the leading edge of the clock pulses. However, the duration of the output pulses (i.e. the duration of the coil transient current) depends upon the torque of the stepping motor. Thus the time duration of the output pulses can be used to determine the torque M of the stepping motor and/or to compare the effective angular momentum M with a reference value $M_L$.

In FIG. 3, the output signal U8 is shown in three cases. The solid curve A represents the output pulse when the stepping motor is in idle motion. In this case the duration of the output impulse measured at the base is equal to $\tau$. The broken curve B represents the output pulse when the stepping motor is loaded. The broken curve C represents the output pulse when the stepping motor is driven, i.e., when the stepping motor acts as a brake.

Figure 4:
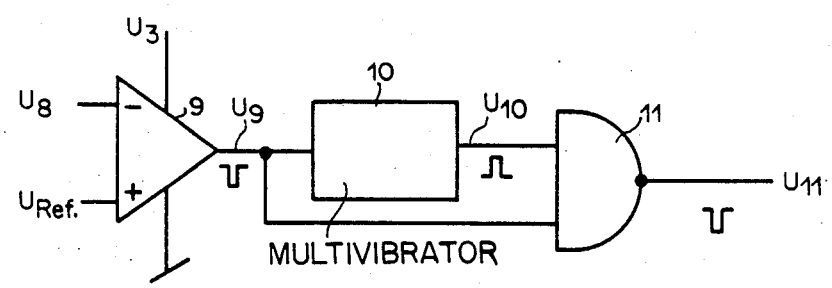
FIG. 4 shows a circuit for comparing the duration of the transient current of the stator coils with a reference duration, in accordance with an illustrative embodiment of the present invention.

The torque M of the stepping motor may be compared with a reference torque $M_L$ by means of the comparator circuit of FIG. 4. The circuit of FIG. 4 comprises a voltage comparator 9, a multivibrator 10, and a gate 11, which gate has two inputs. One input of the gate 11 is connected directly to the output of the voltage comparator 9. The other input of the gate 11 is connected to the output of the multivibrator 10.

The output voltage U8 of the circuit of FIG. 1, is connected to the inverting input of the voltage comparator 9 while a reference voltage $U_{Ref}$ is connected to the non-inverting input of the voltage comparator 9. Power is supplied to the voltage comparator 9 by way of D.C. voltage U3. The multivibrator 10 may be a monostable multivibrator and the gate 11 is an AND gate when it is desired that the output voltage signal U11 comprise positive pulses. If it is desired that the output voltage signal U11 comprise negative pulses, the gate 11 may be a NAND gate.

In an alternative embodiment of the invention, the multivibrator 10 may be an astable multivibrator and the gate 11 may be an AND gate. In this case, a counter (not shown) is coupled to the AND gate.

Figure 5:
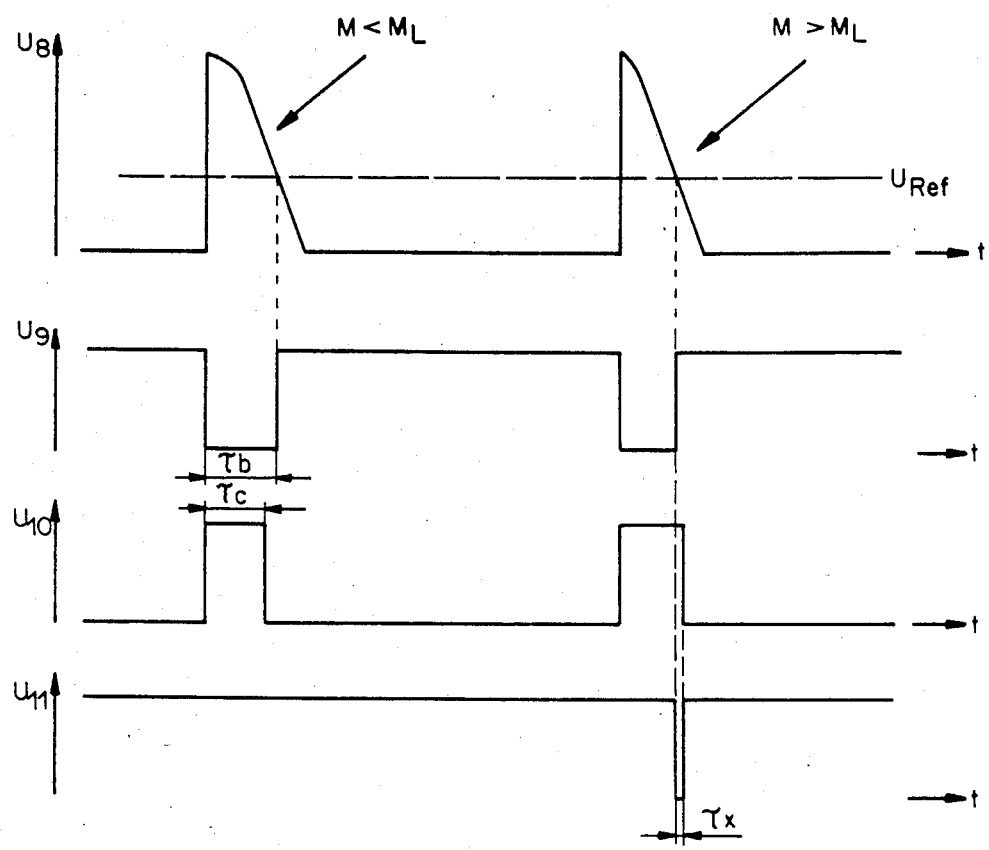
FIG. 5 is a timing diagram for the circuit of FIG. 4.

Operation of the comparator circuit of FIG. 4 may be understood with the aid of the timing diagram of FIG. 5. In FIG. 5, U8 is the output voltage of the circuitry of FIG. 1. $U_{Ref}$ is the aforementioned reference voltage. U9 is the output signal of the voltage comparator 9, U10 is the output signal of the multivibrator 10, and U11 is the output signal of the gate 11. The first pulse comprising signal U8 in FIG. 5 corresponds to the pulse C of FIG. 3 in which case the stepping motor acts as a brake. In this case the torque M of the stepping motor is smaller than a desired or reference torque $M_L$. The second pulse of signal U8 in FIG. 5 corresponds to pulse B of FIG. 3. In this case the stepping motor is loaded and the torque M of the stepping motor is larger than a desired or reference torque $M_L$.

Thus the first pulse of signal U8 in FIG. 5 is of a longer duration than the second pulse. In the voltage comparator 9, the output signal U8 is compared with a predetermined level $U_{Ref}$. $U_{Ref}$ has a value smaller than 0.7 V such as 0.2 V. If the first pulse of the output signal U8 exceeds the reference voltage $U_{Ref}$, then, as seen in FIG. 5, there appears at the output of the voltage comparator 9 digital negative pulses of duration $\tau_b$. The time $\tau_b$ is the time during which the pulses of U8 exceed the reference voltage. The duration $\tau_b$ depends on the torque M of the stepping motor. Thus the duration $\tau_b$ is different for the two pulses comprising U9 in FIG. 5. The negative going leading edge of the pulses comprising signal U9 trigger, in each case, the multivibrator 10 (see FIG. 4), whose output voltage U10 consists of positive, digital impulses of a constant time duration $\tau_c$, which serve as a time reference value. The positive going leading edges of the pulses comprising signal U10 correspond time-wise with the negative going leading edges of the pulses of U9. The time $\tau_c$ corresponds to a reference torque $M_L$ while the time $T_b$ corresponds to the torque M of the stepping motor. If $\tau_b > \tau_c$, as is the case in the first pulse of FIG. 5, then the two inputs of gate 11 never have the same logic value "1" so that the output voltage U11 of gate 11 on utilization of a NAND gate, is constantly equal to the logic value "1".

By contrast, if $\tau_b < \tau_c$, then after termination of the duration $\tau_b$ and before termination of the duration $\tau_c$, the two inputs of gate 11 will simultaneously have for a short time the logic value "1" so that during the time $\tau_x = \tau_c - \tau_b$ the output voltage U11 of the NAND gate will drop to the logic value "0". U11 thus has during this time a short negative impulse of a duration $\tau_x$.

Through regulation of the duration $\tau_x$, the level of the torque M of the stepping motor may be regulated by means of the signal U11 which appears at the output of the comparator circuit of FIG. 4. For example, the stepping motor may be stopped before its operation becomes nonsynchronous.

In accordance with an alternative embodiment of the invention, if the multivibrator 10 is an astable multivibrator, the durations of the pulses comprising the U8 signal are determined by means of clock pulses generated by the astable multivibrator. The clock pulses are passed by the gate during the interval of the pulses comprising the U8 signal and then counted by a counter.

In still another alternative, instead of using the comparator circuit of FIG. 4 to compare the torque M of the stepping motor with a reference or desired torque $M_L$, a microcomputer may be used. In this case the multivibrator 10, the gate 11 and the sequence generator 1 are all part of the microcomputer. In addition to the microcomputer only the voltage comparator 9 will be needed to provide circuitry for the torque comparison. The voltage comparator 9 may, for example, be the type LM 393 of National Semiconductor.

Up to now the pre-determined level $U_{Ref}$ has been assumed as constant. In particular circumstances it may be desirable for the time interval $\tau_x = \tau_c - \tau_b$ to be independent of temperature or supply voltage. This can be achieved by making the level $U_{Ref}$ dependent on temperature or supply voltage. In order to reduce the sensitivity of the circuit of FIG. 4 to variations of the level $U_{Ref}$, it will be of advantage to install an integrator (not illustrated) between the circuitry represented in FIG. 1, and the circuit of FIG. 4 in order to make the slopes of the output signals U8 less steep.

Figure 6:
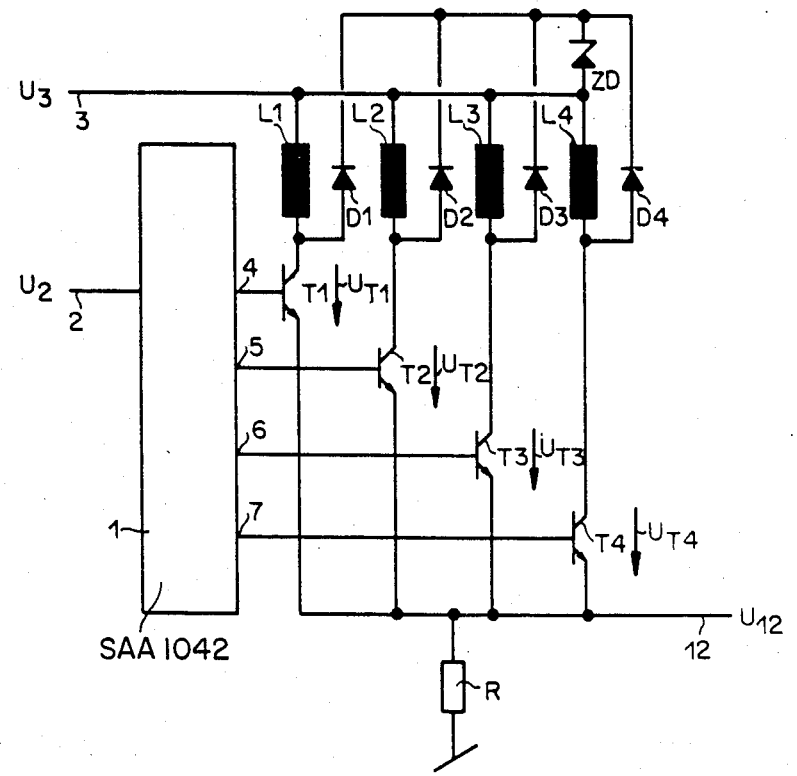
FIG. 6 shows an alternative circuit for driving a D.C. stepping motor in accordance with an illustrative embodiment of the invention.
Figure 9:
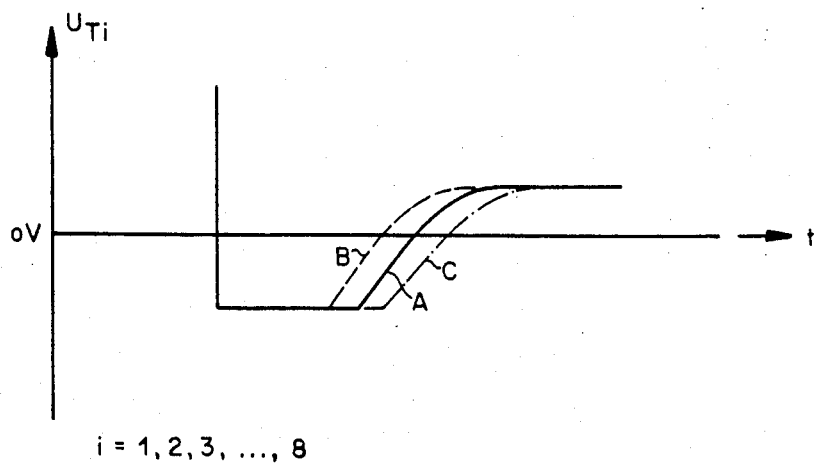
FIG. 9 shows the duration of the transient voltage in the stator coils of FIG. 8.

Alternative circuitry for driving a four phase D.C. stepping motor is shown in FIG. 6. In general, the circuitry of FIG. 6 is similar to the circuitry of FIG. 1. The driving circuitry of FIG. 6 comprises four stator coils L1, L2, L3, L4, one coil for each of the four phases. Four controllable switches T1, T2, T3, T4, are provided, each of the switches T1, T2, T3, T4, being associated with one of the coils L1, L2, L3, L4 respectively. A sequence generator 1 is used to generate control signals U4, U5, U6, U7 (FIG. 2) which signals are applied to switches T1, T2, T3, T4 respectively. As in FIG. 1, the diodes D1, D2, D3, D4 as well as Zener Diode ZD are arranged so as to permit passage of the transient current, when the switches T1, T2, T3, T4 are turned off.

The control signals U4, U5, U6, U7 of FIG. 2 are arranged so that current generally flows through two of the four coils L1, L2, L3, L4 at any one time. The current flowing through the coils passes through the resistance R, which resistance is common to all phases, to produce a voltage drop U12.

As an example the voltage drop across the resistance R may be set to about 0.7 volts. If at the start of one of the clock pulses U2, one of the two coils is turned off by way of turning off one of the switches T, T2, T3, T4, then the transient decay current passes through one of the appropriately biased diodes D1, D2, D3, D4. Accordingly, as soon as one of the coils is turned off the voltage across resistance R drops for a short time to a value such as 0.4 volts. However, the control signals U4, U5, U6, U7 are arranged so that when one coil is turned off another is turned on. The current through resistance R will rise in accordance with a time constant so that the output voltage U12 will again attain its value of 0.7 volts. Thus the output voltage U12 of FIG. 6 is similar to the output voltage U8 of FIG. 1, with the exception that the voltage U12 includes pulses which are characterized by a decrease in voltage while the output voltage U8 of FIG. 3 includes pulses characterized by an increase in voltage.

Figure 7:
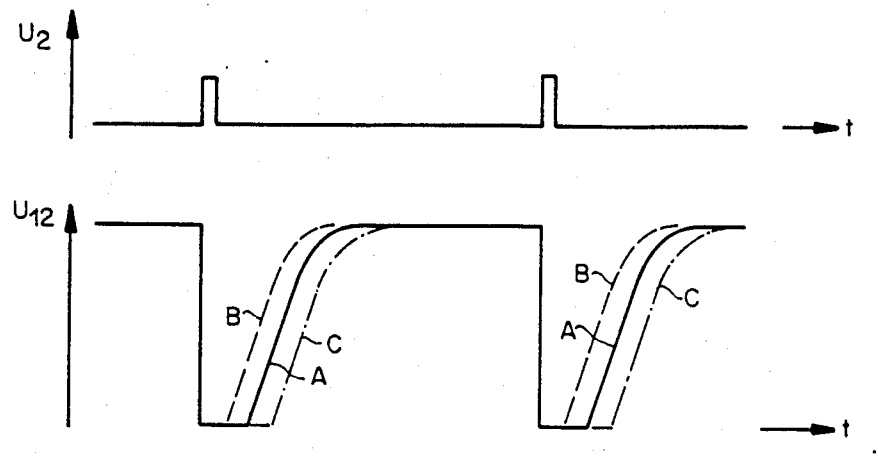
FIG. 7 shows the duration of the transient currents in the stator coils of FIG. 6.

FIG. 7 shows the clock signal U2 along with output signal U12 of FIG. 7. Note that the width of the downward pulses comprising the signal U12 depends upon the torque M of the D.C. stepping motor. Three different values for the torque of the D.C. stepping motor are shown in FIG. 7.

Figure 8:
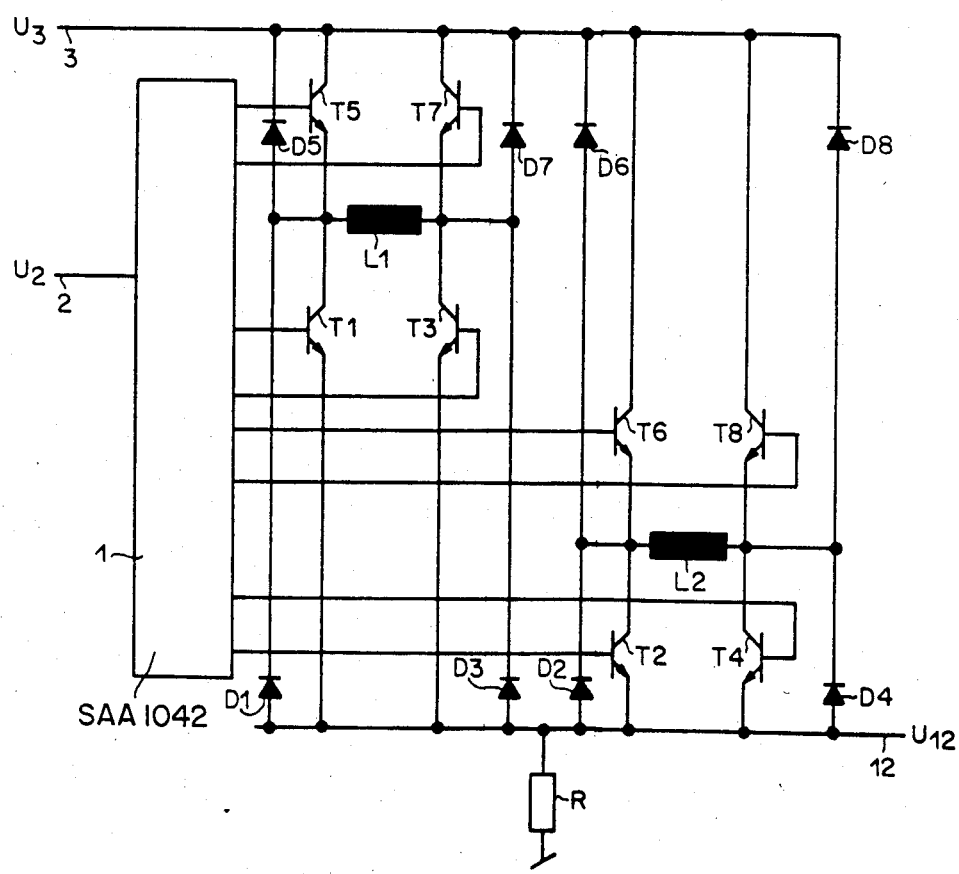
FIG. 8 shows driving circuitry for a two phase D.C. stepping motor in accordance within an illustrative embodiment of the present invention.

FIG. 8 illustrates a driving circuit for a two phase D.C. stepping motor. The circuitry represented in FIG. 8 comprises a sequence generator 1, coils L1 and L2 for each phase, four controllable first switches T1 to T4, four controllable second switches T5 and T8, eight reverse biased diodes D1 to D8 and an outlet resistance R. Each of the two poles of each coil L1 and L2 has associated therewith two controllable switches T1, T5 or T3, T7 or T2, T6 or T4, T8 and two reverse biased diodes D1, D5 or D3, D7 or D2, D6 or D4, D8. The first element in each of the aforementioned pairs is arranged to connect the corresponding pole of the coil directly to D.C. voltage U3. The sequence generator 1 of FIG. 8, besides its clock input 2, has eight control outputs U1 ... U8, which are connected to a control input of one of the eight controllable switches T1 to T8.

The circuitry shown in FIG. 8 operates in a manner similar to that represented in FIG. 6. Its output signal U12 closely resembles the output signal U12 represented in FIG. 7.

The time diagram of the voltages $U_{Ti}$ where i = 1, 2, 3, ... 8, corresponds approximately to the output signal U12 represented in the time diagram of FIG. 7, with the exception that here each downward impulse will assume negative values. The voltages $U_{Ti}$ always represent the voltage drop over one of the controllable switches T1 to T8.

The comparator circuit represented in FIG. 4 may also be connected to the output U12 of the circuitry represented in FIGS. 6 and 8. Here, however, the output voltage U12 must be connected to non-inverting input of voltage comparator 9, while the inverting input of comparator 9 is at the reference voltage $U_{Ref}$.

If the comparator circuit shown in FIG. 4 is used with the driving circuitry of FIG. 6 or FIG. 8, then the predetermined reference voltage must have a value between 0.4 V and 0.7 V, this being subject to the condition that a diode D is switched parallel to resistance R.

Circuitry capable of detecting the torque of a D.C. stepping motor has been described herein. The circuitry is based on the fact that the transient current generated when a stator coil is turned on or off has a duration which is a function of the torque of the stepping motor.

Finally, the above described embodiments of the invention are intended to be illustrative only. Numerous alternative embodiments may be devised by those skilled in the art without departing from the spirit and scope of the following claims.

I claim:
1. An apparatus for controlling a direct current stepping motor comprising
    (a) means for generating a sequence of voltage pulses whose duration is a function of the torque of said motor, and
    (b) means for comparing the duration of said voltage pulses with a reference duration for the subsequent generation of control signals.
2. The apparatus of claim 1, wherein said motor comprises a plurality of phases and said generating means comprises a plurality of coils, one coil for each phase of said motor, and a plurality of switches for sequentially turning on and off said coils so as to generate a sequence of transient current signals, the duration of said transient current signals being a function of the torque of the motor.
3. The apparatus of claim 1, wherein said comparing means comprises
    (a) a voltage comparator for receiving said pulses and a reference voltage as inputs and for outputting signals corresponding to the duration of said voltage pulses at said reference voltage level,
    (b) a multivibrator for generating reference pulses corresponding to a reference duration, and
    (c) a gate for gating the signal corresponding to the duration of said voltage pulses at said level and the signal corresponding to said reference duration for the subsequent generation of control signals.
4. The apparatus of claim 3, wherein said multivibrator is a monostable multivibrator and said gate is an AND gate.

5. The apparatus of claim 3, wherein said multivibrator is a monostable multivibrator and said gate is a NAND gate.

6. The apparatus of claim 1, wherein said comparing means includes an astable multivibrator, a gate, and a counter coupled to said gate, said astable multivibrator generating clock pulses which are passed by said gate and counted by said counter to measure the duration of said voltage pulses.

7. The apparatus of claim 2, wherein each of said coils is connected by means of a diode to a common path for said transient currents.

8. The apparatus of claim 7, wherein said common path for said transient current includes a Zener diode and a resistance, said voltage pulses being measurable across said resistance.

9. The apparatus of claim 3, wherein said multivibrator and said gate are incorporated as part of a microcomputer.

10. The apparatus of claim 3, wherein said generating means includes an integrator for integrating said voltage pulses, said integrator being coupled between said generating means and said comparing means.

11. A circuit for driving a multiphase D.C. stepping motor having a plurality of phases,
said circuit comprising
(a) a plurality of coils, at least one coil for each phase of said motor,
(b) a sequence generator for generating control signals,
(c) at least one switch associated with each of said coils for turning said coils on and off in response to said control signals,
(d) at least one diode associated with each of said coils for coupling transient currents generated when said coils are turned on and off by said switches to a common current path for said transient currents, the duration of said transient currents being proportional to the torque of said motor,
(e) means for comparing the duration of said transient current with a reference duration for the subsequent generation of control signals.

12. The circuit of claim 11 wherein said switches serve to connect the coils between a D.C. voltage and ground and wherein said common path for said transient current is connected to ground by means of a Zener diode and a resistor.

13. The circuit of claim 11 wherein said switches serve to connect the coils between a D.C. voltage and a resistor common to all phases, and wherein said common path for said transient currents is connected to said D.C. voltage by means of a Zener diode.

14. The circuit of claim 11 wherein each pole of each coil is connected to a D.C. voltage by means of one of said switches and one of said diodes, and wherein each pole of each coil is connected to a resistance common to all phases by means of one of said switches and one of said diodes.

15. A method for controlling a D.C. stepping motor comprising the steps of (a) generating a sequence of voltage signals whose duration is a function of the torque of the stepping motor,
(b) comparing the duration of said voltage signals with a reference duration for the subsequent generation of control signals.

16. The method of claim 15 wherein said signal generation step includes the step of generating a transient current by switching on or off a coil comprising part of said motor, the duration of said transient current being a function of the torque of said motor.

17. The method of claim 15 wherein said comparing step includes the steps of
(a) determining the duration of said voltage signals at a given reference voltage level,
(b) comparing the duration of said voltage signals at said level with a predetermined reference duration, and
(c) generating a voltage pulse when the duration of one of said voltage signals at said reference level exceeds the reference duration.

18. The method of claim 15 wherein said comparing step comprises the steps of
(a) releasing clock pulses during each of said voltage signals, and
(b) counting said clock pulses to determine the duration of said voltage signals.

19. The method of claim 16 wherein said transient currents are passed through a resistance.

20. The method of claim 19 wherein said transient currents pass through a diode prior to passing through a resistance, said voltage signals corresponding to the voltage drop across said resistance.

21. A method for controlling the torque of a multiphase D.C. stepping motor having a plurality of phases, said motor comprising a plurality of coils one for each phase, and a plurality of switches, each switch being adapted to turn one of said coils on and off, said method comprising the steps of
sequentially turning said coils on and off to generate a sequence of transient current signals, the duration of said transient current signals being a function of the torque of said motor,
comparing the duration of said transient signals with a reference duration for the subsequent generation of control signals.

22. A circuit for regulating a multiphase stepping motor having a plurality of phases comprising:
(a) a plurality of coils, at least one coil for each phase of said motor,
(b) a sequence generator for generating control signals for said coils.
(c) a switch associated with each of said coils for turning said coils on and off in response to said control signals, transient currents resulting from the turning off of said coils having a measurable duration, and
(d) circuit means for comparing the duration of said transient currents with a predetermined reference duration in order to generate signals for regulating said stepping motor.

* * * * *